(12) United States Patent
Van De Groenendaal

(10) Patent No.: US 8,707,390 B2
(45) Date of Patent: Apr. 22, 2014

(54) SYSTEM AND METHOD FOR SECURE ACCESS CONTROL IN A WIRELESS NETWORK

(75) Inventor: Joannes G. Van De Groenendaal, Portland, OR (US)

(73) Assignee: CA, Inc., Islandia, NY (US)

(*) Notice: Subject to any disclaimer, the term of this patent is extended or adjusted under 35 U.S.C. 154(b) by 1277 days.

(21) Appl. No.: 11/828,739

(22) Filed: Jul. 26, 2007

(65) Prior Publication Data
US 2009/0028335 A1    Jan. 29, 2009

(51) Int. Cl.
*G06F 7/04* (2006.01)
(52) U.S. Cl.
USPC ............ 726/3; 726/1; 726/2; 726/4; 380/247; 380/248; 380/249; 380/250; 713/155; 713/156; 713/157; 713/158; 713/159
(58) Field of Classification Search
USPC ............ 726/1–4; 380/247–250; 713/155–159
See application file for complete search history.

(56) References Cited

U.S. PATENT DOCUMENTS

| | | | |
|---|---|---|---|
| 2005/0101293 A1* | 5/2005 | Mentze et al. | 455/410 |
| 2006/0078124 A1* | 4/2006 | Whelan et al. | 380/273 |
| 2006/0233375 A1* | 10/2006 | Lillie et al. | 380/270 |
| 2006/0251258 A1* | 11/2006 | Lillie et al. | 380/270 |
| 2008/0123852 A1* | 5/2008 | Jiang | 380/273 |
| 2008/0141360 A1* | 6/2008 | Hicks et al. | 726/15 |

OTHER PUBLICATIONS

Jeong et al., "Key Pre-distribution Scheme for Little Storage Space and Strong Security Strength in Large-scale Wireless Sensor Network" 2007, International Conference on Convergence Information Technology, pp. 1572-1577.*
Hytnen et al., An Analysis of Wireless Security, 2006, CCSC: South Central Conference, pp. 210-216.*

* cited by examiner

*Primary Examiner* — Christopher Brown
*Assistant Examiner* — Roderick Tolentino
(74) *Attorney, Agent, or Firm* — Pillsbury Winthrop Shaw Pittman LLP

(57) ABSTRACT

Secure access to a wireless network access can be provided in a system where wireless devices access a wireless network through a wireless access point (WAP). For example, a plurality of pre-shared keys (PSKs) may be generated and distributed to the WAP and the wireless device. The wireless device may automatically rotate an active one of the plurality of PSKs, while the WAP receives one or more rotation signals identifying the active one of the plurality of PSKs. The wireless device and the WAP may encrypt information relating to the active one of the PSKs within communications between them, thus securing the communications.

42 Claims, 2 Drawing Sheets

SYSTEM AND METHOD FOR SECURE ACCESS CONTROL IN A WIRELESS NETWORK

FIELD OF THE INVENTION

The invention relates to securely controlling access to a wireless network by generating and distributing pre-shared keys according to a predetermined schedule.

BACKGROUND OF THE INVENTION

Wireless networks have become increasingly widespread as demands for high-speed, mobile, and flexible network access increase. In a wireless network, data transmission generally includes communication of radio frequency signals between a wireless network card and a wireless access point (WAP). Client devices generally connect to hubs, routers, switches, or other WAPs, which provide a link to a wired network backbone. Although wireless networks tend to implemented locally (e.g., as a local or campus area network), with sufficient broadcast power or signal repeaters, a wireless network may span an expansive coverage area. As a result, unauthorized users falling within the coverage area may attempt to gain access to a wireless network, potentially posing significant security risks. In view of these and other types of security threats, managing security of a wireless network has received significant attention as enterprises and other organizations make decisions about what type of network to deploy.

For example, a secure wireless network may employ various techniques to ensure that a client device or a user of the device has authorization to connect to the network (e.g., encrypting data to minimize a likelihood of eavesdropping or data interception, or verifying authorization credentials of a device or a user, such as a username/password, among other techniques). In this regard, many wireless networks use Wired Equivalent Privacy (WEP) to provide a level of security and privacy comparable to what may be expected of a wired network. WEP purports to establish such protection by encrypting data transmitted over the wireless network to protect vulnerable links between clients and WAPs. Once this measure has been taken, other typical security mechanisms (e.g., password protection, end-to-end encryption, virtual private networks, authentication, etc.) can be employed to ensure privacy.

Due to inherent weaknesses in the design of WEP, however, many enterprise environments have been reluctant to adopt 802.11 wireless networks. For example, WEP encrypts data according to an RC4 (also known as ARC4 or ARCFOUR) stream cipher, resulting in WAPs or wireless network cards in WEP-enabled networks encrypting a payload of each 802.11 frame with the cipher prior to transmission. WEP creates a seed for the encryption by concatenating a shared secret (e.g., a user-supplied password or other secret encoded as a 40-bit or a 64-bit key) and a random 24-bit initialization vector (IV). In a WEP transmission, the seed drives a pseudo-random generator to create a keystream having a length equal to a frame's payload length plus a 32-bit integrity check value (ICV), which ensures that the payload has not been tampered with. Prior to transmission, the keystream may be combined with the payload and the ICV through a bitwise XOR process, creating an encrypted data stream. The IV may be inserted within the first few bytes of the 802.11 frame (e.g., in clear text), and a receiving station uses the IV along with the known shared secret to decrypt the data.

As a result, in order for WEP to work, each entity in a wireless network (e.g., WAPs, end user devices, etc.) needs to have access to the same shared secret (e.g., password). While 802.11 does not require changing the IV for each transmitted frame, many security solutions tend to change the IV for each frame to reduce a likelihood of recovering the shared secret. Even so, WEP tends to be vulnerable, for example, because the IVs only have 24 bits and security keys tend to remain static. Thus, in large enterprise networks with heavy traffic, changing the IV for each frame tends to result in the IVs often being repeated fairly regularly. As such, intruders using simple brute force techniques may easily recover the shared secret within an hour or less, or by using more powerful algorithms, the shared secret could be recovered in a matter of minutes.

To solve this problem, some wireless networks implement 802.1x to dynamically deploy keys. Although dynamic deployment provides some security improvements, 802.1x has several drawbacks, such as requiring a large deployment infrastructure, including radius servers and other back-end security solutions (e.g., Extensible Authentication Protocol). However, as large infrastructures tend to be impractical for individual users or smaller organizations, many wireless network implementations may be excluded from realizing advantages offered by 802.1x. As such, new standards, such as Wi-Fi Protected Access (WAP or WAP-2), were developed to support pre-shared secrets, which addresses some of the shortcomings of WEP.

WPA uses open system authentication, in which each user may be provided with a unique unicast key, while all users may be provided with a common broadcast key. Thus, WPA includes a two-phase authentication process, including a first phase for performing verification and a second phase for performing authentication at a user-level using 802.1x. With 802.1x, the unicast key can be rekeyed optionally, while no mechanism exists for changing the common encryption key used for multicast and broadcast traffic. With WPA, however, both the unicast key and the common encryption key must be rekeyed. As a result, WPA mandates implementation of Temporal Key Integrity Protocol (TKIP). For example, TKIP changes the unicast encryption key for every transmitted frame and synchronizes the change between a wireless client and a WAP. For the global encryption key, WPA includes a facility for the WAP to advertise changes to wireless clients connected to the WAP.

Thus, among other advantages, TKIP verifies security configurations after determining the encryption keys, synchronizes changes of the unicast encryption key for each frame, and determines a unique starting unicast encryption key for each pre-shared key (PSK) authentication. Moreover, TKIP can provide this additional security simply through updating firmware at the WAP or client network interface card. However, in order to generate the PSKs used in WPA, a primary master key (PMK) may have to be generated to initialize the TKIP encryption process. As a result, the TKIP initialization process also introduces weaknesses by being based on a pre-shared secret. For example, weak passwords used for the PSK (e.g., words available in a dictionary) may be subject to brute-force attacks that can recover the PSK, for example, using tools like coWPAtty. Further, mechanisms may need to be developed to inform users of changes to the PSKs, or the process may be subject to post-note syndrome (e.g., where users write passwords on post-notes that can be appropriated from a publicly available place).

Thus, although 802.1x addresses some security concerns by obviating the need to distribute PSKs, this type of solution may not be available in many instances. Furthermore, mechanisms designed to bridge the gap between 802.11 and 802.1x, such as WAP, also present various security risks.

Existing systems suffer from these and other problems.

SUMMARY OF THE INVENTION

According to various aspects of the invention, a system and method for providing secure access to a wireless network may address these and other drawbacks of existing systems.

According to various aspects of the invention, secure access to a wireless network may be provided in a system where wireless devices access a wireless network through a wireless access point (WAP). For example, a plurality of pre-shared keys (PSKs) may be generated and distributed to the WAP and the wireless device. The wireless device may automatically rotate an active one of the plurality of PSKs, while the WAP receives one or more rotation signals identifying the active one of the plurality of PSKs. As such, subsequent communications between the wireless device and the WAP may be secured by encrypting information relating to the active one of the PSKs.

According to various aspects of the invention, secure access to a wireless network may be provided, for example, by generating a plurality of pre-shared keys (PSKs). The generated PSKs may be distributed to at least one wireless access point (WAP) and at least one wireless device, and the wireless device may automatically rotate an active one of the plurality of PSKs according to a predetermined schedule. Further, one or more rotation signals may be communicated to the WAP according to the predetermined schedule, where the rotation signals identify the active one of the plurality of PSKs. As such, communications between the wireless device and the WAP may include encrypted data relating to the active one of PSKs, thereby securing the access to the wireless network.

According to various aspects of the invention, secure access to a wireless network may be provided, for example, by receiving a plurality of pre-shared keys (PSKs) at a wireless device, which automatically rotates an active one of the plurality of PSKs. At least one wireless access point (WAP) coupled to the wireless network may receive one or more rotation signals that identify the active one of the plurality of PSKs. Thus, communications between the wireless device and the WAP may be secured, for example, by the wireless device or the WAP encrypting data relating to the active one of the PSKs within communications to the WAP or the wireless device, respectively.

Other objects and advantages of the invention will be apparent to those skilled in the art based on the following drawings and detailed description.

DETAILED DESCRIPTION

Figure 1:
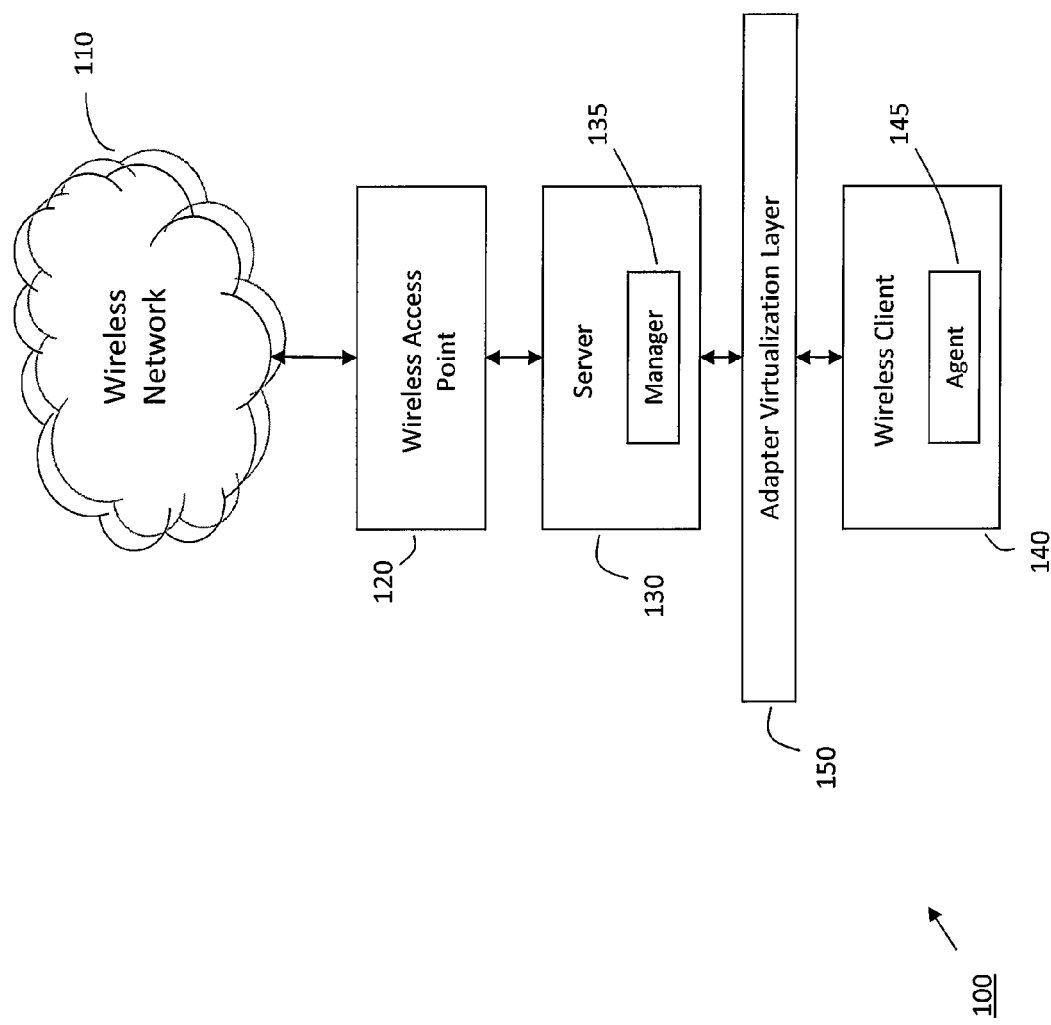
FIG. 1 illustrates an exemplary schematic diagram of a wireless network deployment according to various aspects of the invention.

FIG. 1 illustrates a schematic diagram of an exemplary wireless network system 100 according to various aspects of the invention. The wireless network system 100 may provide a solution that mitigates various risks associated with Wi-Fi Protected Access using pre-shared keys (e.g., WPA-PSK or WPA2-PSK), for example, by generating and protecting one or more pre-shared keys (PSKs) that can be rotated according to a schedule. The schedule can be integrated into a provisioning engine that controls distribution of the PSKs based on authentication of a user or a device. As such, the invention may overcome weaknesses of WPA, for example, by generating strong PSKs that cannot be broken by brute-force techniques, automatically informing users of changes to the PSKs, and reducing a need for users to provide the key (e.g., preventing security breaches caused by user carelessness, such as keeping the PSK written down in a place that can be viewed publicly).

According to various aspects of the invention, system 100 may include a manager/agent architecture, whereby one or more PSKs may be rotated to one or more entities on a wireless network 110. For example, a server 130 may include a manager application 135 that generates strong PSKs and distributes the generated strong PSKs to a wireless access point (WAP) 120, a wireless client 140, or any other entity attempting to gain access to the wireless network 110. Further, although FIG. 1 illustrates an arrangement in which the manager application 135 resides on server 130, it will be apparent that the manager application 135 may be implemented in any suitable arrangement capable of managing distribution or provisioning of PSKs to entities in the wireless network 110. For example, the manager application 135 may execute as part of a virtual machine, firmware operating on a switch, router, or other network device, or otherwise, as will be apparent.

The manager application 135 may generate the PSKs and/or distribute the PSKs according to a predetermined schedule (e.g., PSKs may be generated and/or distributed at predetermined intervals, upon a given condition being satisfied, at a predetermined time, or according to any other scheduling technique). As such, upon being generated by the manager application 135, the strong PSKs may be provisioned, distributed, or otherwise rotated among the WAPs 120, the wireless clients 140, or other devices coupled to the wireless network 110. The manager application 135 may also include a capability of revoking access to the wireless network 110 at a user-level, device-level, group-level, or in other ways, as will be apparent. For example, the manager application 135 may be coupled to an identity and access management solution (e.g., an authoritative source) that defines one or more policies, groups, or other abstractions used to determine user permissions, device permissions, or other access controls (e.g., the manager application 135 could revoke access to all users belonging to a "Guest" group).

As a result, the manager application 135 may handle creation and distribution of PSKs used to access the wireless network 110 via WAPs 120. For example, the manager application 135 communicates with WAPs 120 via one or more communication protocols, including, among others, Simple Network Management Protocol (SNMP), Teletype Network (Telnet), Secure Shell (SSH), HyperText Transfer Protocol (HTTP), Transmission Control Protocol/Internet Protocol (TCP/IP), a proprietary protocol, or any other suitable communication protocol. WAPs 120 may be configured to receive appropriate PSKs on a predetermined basis (e.g., at predetermined intervals, at predetermined times, upon satisfaction of predetermined conditions, etc.).

Further, the manager application 135 communicates with wireless clients 140, for example, by communicating with an agent application 145 that resides on each respective wireless client 140. A connection may be established between the manager application 135 and the agent application 145, and subsequent communication between the manager application 135 and the agent application 145 may be performed using an appropriate communication protocol. For example, in various implementations, subsequent to establishing the connection between the manager application 135 and the agent application, all communications may be over TCP/IP. In this way, the agent application 145 and the manager application 135 can communicate as though connected by a wired connection, and the wireless client 140 can then establish a link directly to the WAP 120.

For example, using TCP/IP, the manager application 135 can have flexibility to provision PSKs to the agent application 145 out-of-band (e.g., to send "urgent data" that appears to the agent application 145 as a data stream separate from a primary data stream, or to send data via a separate dedicated channel, or in other ways), via an actual wired connection, to provision a proprietary Extensible Authentication Protocol (EAP) over 802.1x, or in other ways. As a result, the agent application 145 can be provisioned with an appropriate schedule for rotating PSKs, and the manager application 135 may be configured to rotate the PSKs to the WAPs 120 and to send updates to provisioned clients 140 according to the schedule.

Thus, according to various aspects of the invention, system 100 may include a manager application 135 that handles creation and distribution of WPA-PSK and/or WPA2-PSK schedules, which may be rotated among the WAPs 120 coupled to the wireless network 110. The manager application 135 may also create and provision PSKs to agent applications 145 associated with client devices 140 coupled to the network 110. Once the client 140 gains access to the wireless network 110, the manager application 135 may validated provisioned PSKs as part of a handshake process. Moreover, the manager application 135 may include logic for revoking schedules or PSK provisioning (e.g., to disable access for an unauthorized client or user).

Further, the agent application 140 associated with client device 145 may be responsible for requesting PSK schedule provisioning from the manager application 135. Thus, the agent application 140 may rotate PSKs according to the provisioned schedule, such that a correct PSK can be used to access the network 110 at any given moment. The agent application 145 may also be responsive to the manager application 135 requesting revocation of the schedules and/or the provisioning, to performing revocation at a predetermined time, according to a schedule, or in other ways. Upon achieving network connectivity, the agent application 145 may participate in the handshake process with the manager application 135. Furthermore, the agent application 145 may be responsible for removing PSKs from the wireless client 140 when agent application 145 shuts down, terminates unexpectedly, upon losing network connectivity, or in response to any number of other conditions, as will be apparent.

Furthermore, additional security measures may be provided by encrypting the scheduling data in the manager application 135 and/or the agent application 145 using strong encryption techniques, such as the Advanced Encryption Standard (AES). However, it will be apparent that additional security measures may be implemented, and that other encryption techniques may be utilized. For example, as described above, the agent application 145 and the manager application 135 may perform a handshake process to validate a wireless client 140 that has gained access to the wireless network 110. Thus, to ensure that a user of the client 140 actually has permission to access the network 110, an adapter virtualization layer 150 may be included in the system 100 as an additional security measure. The adapter virtualization layer 150 may control all packets being transmitted to and/or from the client 140, for example, by restricting traffic transmitted to and/or from the wireless client 140 during the handshake between the agent application 145 and the manager application 135. For example, the adapter virtualization layer 150 may restrict outgoing traffic to management data relating to validation of the client 140 and/or the user of the client 140. In this way, even when the PSK schedules have been provisioned to a client 140 erroneously (e.g., when the client 140 does not have proper permissions), the virtualization layer 150 may restrict networking capabilities provided to the client 140 validation has occurred.

Figure 2A:
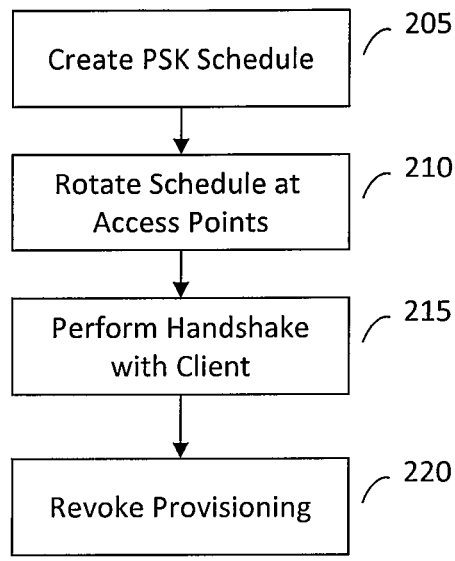
FIGS. 2a-b illustrate exemplary flow diagrams of methods for securing data transmitted in a wireless network according to various aspects of the invention.
Figure 2B:
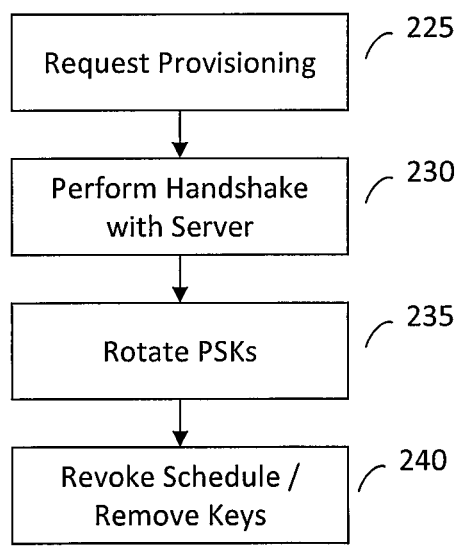

FIGS. 2a-b illustrate an exemplary flow diagrams of methods for securing data transmitted in a wireless network according to various aspects of the invention. For example, FIG. 2a may be performed by a manager application responsible for creating, distributing, and rotating WPA-PSK and WPA2-PSK schedules to one or more wireless access points, and for validating wireless clients that request provisioning of the WPA-PSK and WPA2-PSK schedules, among other things. By contrast, FIG. 2b may be performed by an agent application responsible for requesting the WPA-PSK and WPA2-PSK schedules on behalf of a wireless client and rotating PSKs as appropriate, among other things.

Referring to FIG. 2a, the manager application may create one or more WPA-PSK or WPA2-PSK schedules at an operation 205. The created schedules may include a plurality of strong PSKs generated, for example, to resist brute-force recovery. For example, in various implementations, the strong PSKs may include alphanumeric strings that include a randomly generated combinations letters, numbers, or other characters, and which do not include dictionary words or other easily guessed terms. Further, the strong PSKs may be generated to include a maximum number of characters permitted, which can make the PSK more difficult to crack. It will be apparent, however, that any number of techniques can be used to generate strong PSKs, and that any suitable technique for encrypting or encoding PSKs may be used in accordance with the techniques described herein. Furthermore, the plurality of PSKs may be associated with one or more schedules indicating which PSK will be valid according to a given scheduling criteria. For example, the schedules may include timing criteria that indicate which PSK to use at a given time. Moreover, the PSKs and corresponding schedules may be stored in an encrypted form within any given device in which they may be stored.

The PSK schedules may be rotated among one or more WAPs and/or one or more wireless client devices at an operation 210. The schedule rotation may occur at predetermined intervals, at predetermined times, upon satisfaction of a predetermined condition, or in other ways, as will be apparent. For example, after generating and distributing the PSK schedules, a manager application may be responsible for rotating which of the scheduled PSKs will be currently active on the WAP at any given time (e.g., a signal may be sent to a WAP to indicate that a currently active PSK should be rotated according to the schedule). As a result, the WAP may be configured to have a list of PSKs that will be used by clients to access the network, and the manager application may rotate an active one of the PSKs according to the schedule. Further, it will be apparent that various scheduling functions may be used, without limitation (e.g., a simple rotation through an arrayed list, or entries may be activated according to a function that generates an index as a function of time, or in other ways).

When a wireless device accesses the wireless network, an operation 215 may include a provisioning handshake that occurs between the manager application and an agent application associated with the device. For example, the device may access the wireless network, and thereafter, the manager application may validate whether the device should have access to the network during the handshake process. During the handshake process, a virtualization layer may control traffic communicated to and/or from the wireless device, such that data transmitted by the wireless device may be restricted to management data for validating the device or a user of the device. As such, even when the PSK schedule was provisioned to the device in error, the virtualization layer may restrict capabilities of the device until the manager application can perform validation. Thus, in various implementations, the handshake process may include the wireless device communicating user or device authentication data (e.g., a username and password), and the manager application may consult an identity and access management solution or other appropriate authoritative source to determine whether the device or the user should be granted access. When the handshake process results in validation, the wireless device may periodically be provided with updated PSK rotation schedules, as appropriate. An agent application may thus rotate a currently active PSK according to the schedule, and the periodic updates may ensure that the WAP and the client device have synchronized PSK schedules at all times.

When the handshake process fails, however, the manager application can revoke the wireless device's permission to communicate with the network at an operation 220. Moreover, the manager application may revoke previously distributed PSK schedules at operation 220 (e.g., when a new PSK schedule will be distributed), or schedules could be revoked at a user-level, group-level, device-level, or in other ways. For example, by being tied to the identity and access management solution or other authoritative source, the manager application can control distribution and revocation of PSK schedules according to criteria defined in the authoritative sources. As a result, PSKs and PSK schedules can be dynamically provisioned, revoked, or otherwise modified in response to changing circumstances, or as better encryption algorithms become available, or in other ways, as will be apparent.

Referring to FIG. 2b, the agent application may request provisioning from the manager application at an operation 225. The agent application may then receive the appropriate PSK rotation schedule, which can be used to access the wireless network via a WAP provisioned with the PSK schedule. For example, the agent application may include all necessary logic to activate one or more of the PSKs according to the schedule, while the manager application may perform the rotation at the WAP. In this way, the agent application and the manager application perform PSK rotation synchronously, such that the wireless device and the WAP both know which PSK to use without having to communicate with each other. Instead, the manager application and the agent application remain synchronized, whereby the manager application sends periodic updates to the agent application to ensure that the applications remain synchronized over time.

Further, in an operation 230, the agent application may initiate the handshake process with the manager application upon obtaining network connectivity. In this way, the manager application can validate that the provisioning of the PSKs was permitted, and communications of the wireless device may be restricted until the validation can occur. When the handshake results in validation, the agent application may continue to rotate the PSKs according to the schedule in an operation 235, subject to the periodic updates from the manager application.

In various implementations, the periodic updates may also include a revocation to one or more schedules, one or more specific PSKs, or an outright termination of PSK schedule provisioning (e.g., when the handshake indicates that the device or the user of the device does not have appropriate permissions), among other things. Further, revocation may not necessarily occur at the manager application's request, but may also be built in to the schedule, the agent application, or in other ways (e.g., the PSK schedule may expire at a predetermined time). In either event, at an operation 240, the agent application may revoke the PSK schedules, terminate provisioning, delete the PSKs and associated schedules, or perform other functions to discontinue a client's access. For example, the agent application may perform the revocation operation 240 upon receiving such a request from the manager application, at an expiration time, when the agent application will be shutting down, when the agent application terminated unexpectedly, or for other reasons. As such, in addition to having the appropriate logic to receive and rotate a schedule of PSKs, the agent application may be configured with logic to prevent a wireless device from gaining unauthorized access to a wireless network.

Further, by encrypting the PSK schedule at the manager application, the agent application, or anywhere else that the schedules may be stored, a user of a device that received unauthorized provisioning of the PSK schedules may be prevented from misappropriating the PSKs. For example, when the handshake process fails to result in a validation, the manager application may be configured to mark the PSK schedule as compromised, and thereafter revoke the PSK schedule at the WAP, at other devices, or at any other device that previously received the schedule. Thus, even if the unauthorized user can subsequently crack the encryption and obtain the PSKs, the manager application would have already invalidated the PSKs, meaning that the user would have cracked an obsolete set of PSKs that can no longer be used to gain access to the network.

Implementations of the invention may be made in hardware, firmware, software, or any suitable combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that one skilled in the art may be able to effect such feature, structure, or characteristic in connection with other aspects or implementations, whether or not explicitly described. Thus, various changes and modifications may be made to the provided description without departing from the scope or spirit of the invention. As such, the specification and drawings should be regarded as exemplary only, and the scope of the invention determined solely by the appended claims.

What is claimed is:

1. A method of providing secure access to a wireless network, the method comprising:
generating a plurality of pre-shared keys and a schedule to rotate an active one of the plurality of pre-shared keys at a manager application that resides on a network entity external to a wireless access point that provides access to the wireless network;
distributing the plurality of pre-shared keys from the manager application to the wireless access point and a wireless device, wherein the wireless access point and the wireless device encrypt data with the active one of the plurality of pre-shared keys to communicate over the wireless network;
provisioning the schedule to rotate the active one of the plurality of pre-shared keys from the manager application to the wireless device, wherein the wireless device uses the schedule provisioned from the manager application to automatically rotate the active one of the plurality of pre-shared keys without further communicating with the manager application or the wireless access point with respect to rotation of the active one of the plurality of pre-shared keys; and
communicating, from the manager application to the wireless access point, a plurality of rotation signals that cause rotation of the active one of the plurality of pre-shared keys on the wireless access point, wherein the manager application communicates each of the plurality of the rotation signals synchronously with a passing of a time interval defined in the schedule provisioned to the wireless device.

2. The method of claim 1, wherein provisioning the schedule to the wireless device and communicating the plurality of rotation signals to the wireless access point causes the wireless device and the wireless access point to know the active one of the plurality of pre-shared keys without having to communicate with one another.

3. The method of claim 2, wherein the manager application communicates the plurality of rotation signals according to the schedule provisioned to the wireless device.

4. The method of claim 2, further comprising:
encrypting the plurality of pre-shared keys at the manager application prior to distributing the plurality of pre-shared keys from the manager application to the wireless access point and the wireless device; and
encrypting the schedule to rotate the active one of the plurality of pre-shared keys at the manager application prior to provisioning the schedule from the manager application to the wireless device.

5. The method of claim 2, further comprising communicating a revocation signal from the manager application to the wireless device and/or the wireless access point, wherein the revocation signal invalidates information relating to one or more of the plurality of pre-shared keys distributed to the wireless device and/or the wireless access point, the schedule provisioned to the wireless device, or a user, a group of users, a device, or a group of devices associated with the wireless network.

6. The method of claim 1, further comprising sending, from the manager application to the wireless device, a periodic update relating to the plurality of rotation signals to synchronize the manager application with an agent application that use the schedule provisioned from the manager application to automatically rotate the active one of the plurality of pre-shared keys on the wireless device.

7. The method of claim 1, further comprising performing a handshake process to validate whether the wireless device has permission to access the wireless network, wherein an adapter virtualization layer restricts traffic that the wireless device can communicate over the wireless network until the handshake process validates that the wireless device has permission to access the wireless network.

8. The method of claim 7, wherein the adapter virtualization layer restricts the traffic that the wireless device can communicate over the wireless network to management data relating to validating whether the wireless device has permission to access the wireless network.

9. A non-transitory computer readable medium storing computer executable instructions to provide secure access to a wireless network, wherein executing the computer executable instructions on a processor causes the processor to:
generate a plurality of pre-shared keys and a schedule to rotate an active one of the plurality of pre-shared keys at a manager application that executes the computer executable instructions on the processor, wherein the manager application and the processor reside on a network entity external to a wireless access point that provides access to the wireless network;
distribute the plurality of pre-shared keys from the manager application to the wireless access point and a wireless device, wherein the wireless access point and the wireless device encrypt data with the active one of the plurality of pre-shared keys to communicate over the wireless network;
provision the schedule to rotate the active one of the plurality of pre-shared keys from the manager application to the wireless device, wherein the wireless device uses the schedule provisioned from the manager application to automatically rotate the active one of the plurality of pre-shared keys without further communicating with the manager application or the wireless access point with respect to rotation of the active one of the plurality of pre-shared keys; and
communicate, from the manager application to the wireless access point, a plurality of rotation signals that cause rotation of the active one of the plurality of pre-shared keys on the wireless access point, wherein the manager application communicates each of the plurality of the rotation signals synchronously with a passing of a time interval defined in the schedule provisioned to the wireless device.

10. The non-transitory computer readable medium of claim 9, wherein the schedule provisioned to the wireless device and the plurality of rotation signals communicated to the wireless access point cause the wireless device and the wireless access point to know the active one of the plurality of pre-shared keys without having to communicate with one another.

11. The non-transitory computer readable medium of claim 10, wherein the processor and the manager application communicate the plurality of rotation signals according to the schedule provisioned to the wireless device.

12. The non-transitory computer readable medium of claim 10, wherein executing the computer executable instructions on the processor further causes the processor to:
encrypt the plurality of pre-shared keys at the manager application prior to distributing the plurality of pre-shared keys from the manager application to the wireless access point and the wireless device; and encrypt the schedule to rotate the active one of the plurality of pre-shared keys at the manager application prior to provisioning the schedule from the manager application to the wireless device.

13. The non-transitory computer readable medium of claim 10, wherein executing the computer executable instructions on the processor further causes the processor to communicate a revocation signal from the manager application to the wireless device and/or the wireless access point, wherein the revocation signal invalidates information relating to one or more of the plurality of pre-shared keys distributed to the wireless device and/or the wireless access point, the schedule provisioned to the wireless device, or a user, a group of users, a device, or a group of devices associated with the wireless network.

14. The non-transitory computer readable medium of claim 9, wherein executing the computer executable instructions on the processor further causes the processor to send, from the manager application to the wireless device, a periodic update relating to the plurality of rotation signals to synchronize the manager application with an agent application that uses the schedule provisioned from the manager application to automatically rotate the active one of the plurality of pre-shared keys on the wireless device.

15. The non-transitory computer readable medium of claim 9, wherein executing the computer executable instructions on the processor further causes the processor to perform a handshake process to validate whether the wireless device has permission to access the wireless network, wherein an adapter virtualization layer restricts traffic that the wireless device can communicate over the wireless network until the handshake process validates that the wireless device has permission to access the wireless network.

16. The non-transitory computer readable medium of claim 15, wherein the adapter virtualization layer restricts the traffic that the wireless device can communicate over the wireless network to management data relating to validating whether the wireless device has permission to access the wireless network.

17. A method to receive secure access to a wireless network, the method comprising:
receiving, at a wireless device, a plurality of pre-shared keys and a schedule to rotate an active one of the plurality of pre-shared keys from a manager application that resides on a network entity external to a wireless access point that provides access to the wireless network, wherein the manager application further distributes the plurality of pre-shared keys to the wireless access point;
automatically rotating the active one of the plurality of pre-shared keys at the wireless device, wherein the wireless device uses the schedule received from the manager application to automatically rotate the active one of the plurality of pre-shared keys without further communicating with the manager application or the wireless access point with respect to rotation of the active one of the plurality of pre-shared keys, and wherein the manager application communicates a plurality of rotation signals to the wireless access point to cause rotation of the active one of the plurality of pre-shared keys on the wireless access point, wherein the manager application communicates each of the plurality of the rotation signals synchronously with a passing of a time interval defined in the schedule received at the wireless device; and
encrypting, at the wireless device, data communicated to the wireless access point over the wireless network with the active one of the plurality of pre-shared keys, wherein the wireless access point decrypts the data communicated from the wireless device with the active one of the plurality of pre-shared keys.

18. The method of claim 17, wherein the schedule that the wireless device receives from the manager application and the plurality of rotation signals that the wireless access point receives from the manager application cause the wireless device and the wireless access point to know the active one of the plurality of pre-shared keys without having to communicate with one another.

19. The method of claim 18, wherein the manager application communicates the plurality of rotation signals according to the schedule received at the wireless device.

20. The method of claim 18, wherein the manager application encrypts the plurality of pre-shared keys distributed to the wireless device and the wireless access point and further encrypts the schedule distributed to the wireless device, and wherein the method further comprises decrypting, at the wireless device, the plurality of pre-shared keys and the schedule received from the manager application.

21. The method of claim 18, further comprising receiving a revocation signal communicated from the manager application at the wireless device, wherein the revocation signal invalidates information relating to one or more of the plurality of pre-shared keys received at the wireless device, the schedule received at the wireless device, or a user, a group of users, a device, or a group of devices associated with the wireless network.

22. The method of claim 17, further comprising receiving, at the wireless device, a periodic update from the manager application that relates to the plurality of rotation signals communicated to the wireless access point, wherein the periodic update received from the manager application synchronizes the manager application with an agent application that uses the schedule received from the manager application to automatically rotate the active one of the plurality of pre-shared keys on the wireless device.

23. The method of claim 17, further comprising performing, at the wireless device, a handshake process with the manager application to validate that the wireless device has permission to access the wireless network, wherein an adapter virtualization layer restricts traffic that the wireless device can communicate over the wireless network until the handshake process validates that the wireless device has permission to access the wireless network.

24. The method of claim 23, wherein the adapter virtualization layer restricts the traffic that the wireless device can communicate over the wireless network to management data relating to validating whether the wireless device has permission to access wireless network.

25. The method of claim 17, further comprising decrypting, at the wireless device, data that the wireless access point communicates to the wireless device over the wireless network with the active one of the plurality of pre-shared keys, wherein the wireless access point encrypts the data communicated to the wireless device with the active one of the plurality of pre-shared keys.

26. A non-transitory computer readable medium storing computer executable instructions to receive secure access to a wireless network, wherein executing the computer executable instructions on a wireless device causes the wireless device to:
receive a plurality of pre-shared keys and a schedule to rotate an active one of the plurality of pre-shared keys from a manager application that resides on a network entity external to a wireless access point that provides access to the wireless network, wherein the manager application further distributes the plurality of pre-shared keys to the wireless access point;

automatically rotate the active one of the plurality of pre-shared keys at the wireless device using the schedule received from the manager application without further communicating with the manager application or the wireless access point with respect to rotation of the active one of the plurality of pre-shared keys, wherein the manager application communicates a plurality of rotation signals to the wireless access point to cause rotation of the active one of the plurality of pre-shared keys on the wireless access point, wherein the manager application communicates each of the plurality of the rotation signals synchronously with a passing of a time interval defined in the schedule received at the wireless device; and encrypt data communicated to the wireless access point over the wireless network with the active one of the plurality of pre-shared keys, wherein the wireless access point decrypts the data communicated from the wireless device with the active one of the plurality of pre-shared keys.

27. The non-transitory computer readable medium of claim 26, wherein the schedule that the wireless device receives from the manager application and the plurality of rotation signals that the wireless access point receives from the manager application cause the wireless device and the wireless access point to know the active one of the plurality of pre-shared keys without having to communicate with one another.

28. The non-transitory computer readable medium of claim 27, wherein the manager application communicates the plurality of rotation signals according to the schedule received at the wireless device.

29. The non-transitory computer readable medium of claim 27, wherein the manager application encrypts the plurality of pre-shared keys distributed to the wireless device and the wireless access point and further encrypts the schedule distributed to the wireless device, and wherein executing the computer executable instructions on the wireless device further causes the wireless device to decrypt the plurality of pre-shared keys and the schedule received from the manager application.

30. The non-transitory computer readable medium of claim 27, wherein executing the computer executable instructions on the wireless device further causes the wireless device to receive a revocation signal communicated from the manager application, wherein the revocation signal invalidates information relating to one or more of the plurality of pre-shared keys received at the wireless device, the schedule received at the wireless device, or a user, a group of users, a device, or a group of devices associated with the wireless network.

31. The non-transitory computer readable medium of claim 26, wherein executing the computer executable instructions on the wireless device further causes the wireless device to receive a periodic update from the manager application that relates to the plurality of rotation signals communicated to the wireless access point, wherein the periodic update received from the manager application synchronizes the manager application with an agent application that that executes on the wireless device and uses the schedule received from the manager application to automatically rotate the active one of the plurality of pre-shared keys on the wireless device.

32. The non-transitory computer readable medium of claim 26, wherein executing the computer executable instructions on the wireless device further causes the wireless device to perform a handshake process with the manager application to validate a that the wireless device has permission to access the wireless network, wherein an adapter virtualization layer restricts traffic that the wireless device can communicate over the wireless network until the handshake process validates that the wireless device has permission to access the wireless network.

33. The non-transitory computer readable medium of claim 32, wherein the adapter virtualization layer restricts the traffic that the wireless device can communicate over the wireless network to management data relating to validating whether the wireless device has permission to access the wireless network.

34. The non-transitory computer readable medium of claim 26, wherein executing the computer executable instructions on the wireless device further causes the wireless device to decrypt data that the wireless access point communicates to the wireless device over the wireless network with the active one of the plurality of pre-shared keys, wherein the wireless access point encrypts the data communicated to the wireless device with the active one of the plurality of pre-shared keys.

35. A system to provide secure access to a wireless network, the system comprising:
a wireless access point configured to provide access to the wireless network; and
a server coupled to the wireless access point and a wireless device configured to communicate over the wireless network through the wireless access point, wherein the server resides on a network entity external to the wireless access point that provides access to the wireless network and comprises a non-transitory computer readable medium storing a manager application configured to execute on the server and cause the server to:
generate a plurality of pre-shared keys and a schedule to rotate an active one of the plurality of pre-shared keys;
distribute the plurality of pre-shared keys to the wireless access point and the wireless device, wherein the wireless access point and the wireless device are configured to encrypt data with the active one of the plurality of pre-shared keys to communicate over the wireless network;
provision the schedule to rotate the active one of the plurality of pre-shared keys from the manager application to the wireless device, wherein the wireless device is further configured to use the schedule provisioned from the server to automatically rotate the active one of the plurality of pre-shared keys without further communicating with the server or the wireless access point with respect to rotation of the active one of the plurality of pre-shared keys; and
communicate a plurality of rotation signals to the wireless access point to cause rotation of the active one of the plurality of pre-shared keys on the wireless access point, wherein the server is configured to communicate each of the plurality of the rotation signals synchronously with a passing of a time interval defined in the schedule provisioned to the wireless device.

36. The system of claim 35, wherein the schedule provisioned to the wireless device and the plurality of rotation signals communicated to the wireless access point cause the wireless device and the wireless access point to know the active one of the plurality of pre-shared keys without having to communicate with one another.

37. The system of claim 36, wherein the server is configured to communicate the plurality of rotation signals according to the schedule provisioned to the wireless device.

38. The system of claim 36, wherein the manager application is further configured to cause the server to:

encrypt the plurality of pre-shared keys prior to distributing the plurality of pre-shared keys to the wireless access point and the wireless device; and encrypt the schedule to rotate the active one of the plurality of pre-shared keys prior to provisioning the schedule to the wireless device.

39. The system of claim 36, wherein the manager application is further configured to cause the server to communicate a revocation signal to the wireless device and/or the wireless access point, wherein the revocation signal invalidates information relating to one or more of the plurality of pre-shared keys distributed to the wireless device and/or the wireless access point, the schedule provisioned to the wireless device, or a user, a group of users, a device, or a group of devices associated with the wireless network.

40. The system of claim 35, wherein the manager application is further configured to cause the server to send a periodic update to the wireless device that relates to the plurality of rotation signals communicated to the wireless access point, wherein the periodic update sent to the wireless device synchronizes the manager application with an agent application that use the schedule provisioned from the server to automatically rotate the active one of the plurality of pre-shared keys on the wireless device.

41. The system of claim 35, wherein the manager application is further configured to cause the server to perform a handshake process to validate whether the wireless device has permission to access the wireless network, and wherein the system further comprises an adapter virtualization layer configured to restrict traffic that the wireless device can communicate over the wireless network until the handshake process validates that the wireless device has permission to access the wireless network.

42. The system of claim 41, wherein the adapter virtualization layer is configured to restrict the traffic that the wireless device can communicate over the wireless network to management data relating to validating whether the wireless device has permission to access the wireless network.

\* \* \* \* \*

UNITED STATES PATENT AND TRADEMARK OFFICE
CERTIFICATE OF CORRECTION

PATENT NO. : 8,707,390 B2  
APPLICATION NO. : 11/828739  
DATED : April 22, 2014  
INVENTOR(S) : J. Van De Groenendaal Page 1 of 1

It is certified that error appears in the above-identified patent and that said Letters Patent is hereby corrected as shown below:

In the Claims

Column 9, line 67 (Claim 6) change "use" to --uses--.

Column 16, line 2 (Claim 40) change "use" to --uses--.

Signed and Sealed this  
Second Day of December, 2014

Michelle K. Lee  
*Deputy Director of the United States Patent and Trademark Office*